United States Patent
Konersmann et al.

[11] 3,900,720
[45] Aug. 19, 1975

[54] METHOD AND APPARATUS FOR APPLYING AN INSTALLATION DIMENSION TO A BEVEL GEAR

[75] Inventors: Erhard Konersmann, Zurich; Rudolf Gruber, Bichelsee, both of Switzerland

[73] Assignee: Werkzeugmaschinenfabrik Oerlikon-Bührle AG, Zurich, Switzerland

[22] Filed: July 1, 1974

[21] Appl. No.: 484,776

[52] U.S. Cl. .................... 235/151.32; 33/179.5 R
[51] Int. Cl.² .................................. G01M 13/02
[58] Field of Search ............. 33/179.5 R, 179.5 B; 235/151.32

[56] References Cited
UNITED STATES PATENTS
1,209,377   12/1916   Baker ..................... 33/179.5 B
3,795,143   3/1974   Deprez ..................... 33/179.5 B FOREIGN PATENTS OR APPLICATIONS
729,142   5/1955   United Kingdom ........... 33/179.5 R Primary Examiner—Eugene G. Botz
Attorney, Agent, or Firm—Werner W. Kleeman

[57] ABSTRACT

A method of, and apparatus for, applying an installation or mounting dimension to a bevel gear wherein the dimension of the shoulder of the bevel gear is determined and stored and there is automatically determined the addendum dimension of the bevel gear. This addendum dimension is stored and the stored shoulder dimension and addendum dimension are added together to from a block dimension, and then this block dimension is applied to the bevel gear.

3 Claims, 1 Drawing Figure

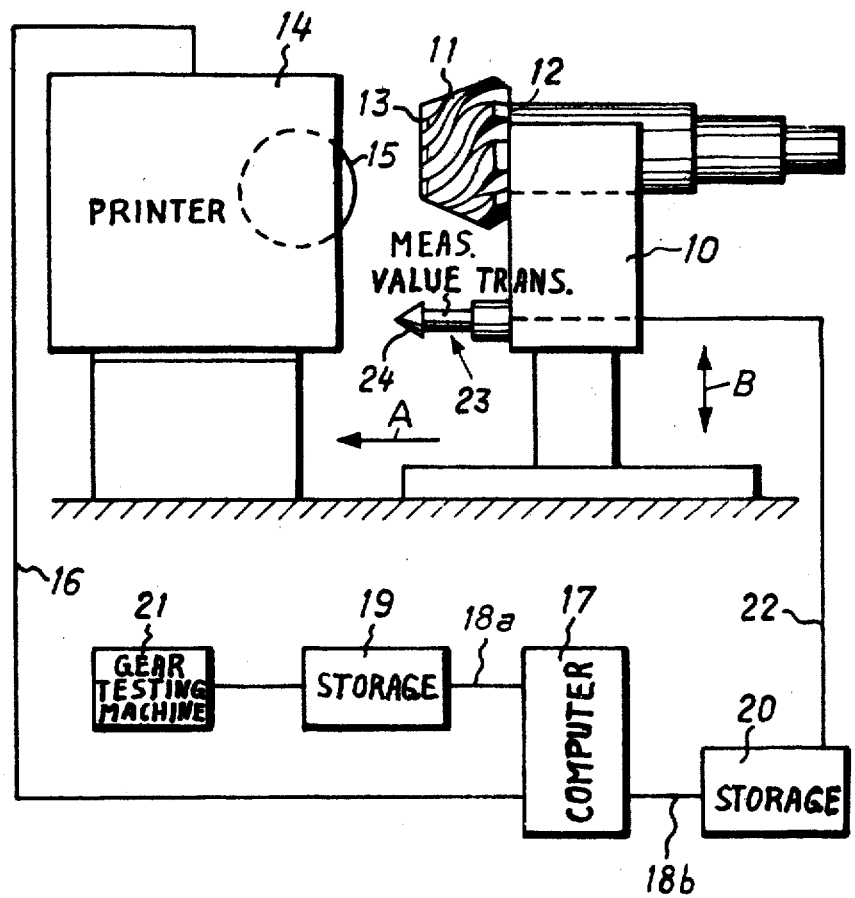

METHOD AND APPARATUS FOR APPLYING AN INSTALLATION DIMENSION TO A BEVEL GEAR

BACKGROUND OF THE INVENTION

The present invention relates to a new and improved method of applying an installation or mounting dimension to a bevel gear, wherein the shoulder dimension of the bevel gear is determined and stored.

The invention further relates to a new and improved construction of apparatus for carrying out the aforesaid method aspects comprising a bevel gear testing or checking machine for determining the shoulder dimension of the bevel gear, a storage for storing such shoulder dimension, a measuring device for determining the bevel gear addendum dimension, a further storage for storing such bevel gear addendum dimension and a marking device for applying data to the bevel gear.

According to a state-of-the-art technique of this type initially there is determined at a bevel gear testing machine the mutual position of the bevel gears for the optimum smooth running or optimum bearing load. The thus determined dimension from the theoretical mounting or installation distance is then subsequently engraved at the pinion. This dimension is measured at the rear shoulder of the pinion and designated as the shoulder dimension. However, since with a pair of mounted bevel gears the rear pinion shoulder is only accessible with difficulty it is not possible to control whether there has been maintained the determined dimension during the installation of the gears. Therefore it is necessary to measure the dimension which is to be determined at the front face or surface of the pinion. During mounting it is then however also necessary to take into account the deviation of the addendum of the pinion from its theoretical value, hereinafter referred to as the addendum dimension. For this purpose there is mounted at the bevel gear testing machine an additional measuring device. The marking or inscription device therefore, apart from applying the pair number as well as the addendum dimension must also apply the shoulder dimension to the pinion.

This method is associated with the following drawbacks: Firstly, the additional measuring device impairs the operation of the bevel gear testing machine since the accessibility is rendered more difficult. Secondly, there is present an increased danger of contaminating the measuring device, with the result that the measurement accuracy is impaired. Thirdly, there is increased the processing time of a bevel gear both at the bevel gear testing machine due to the additional measurement operation as well as also at the marking device due to the additional marking or inscription operation. Fourthly, during the control or checking work following the mounting it is necessary to always take into account two numbers.

SUMMARY OF THE INVENTION

The present invention relates to a new and improved method of, and apparatus for, applying a mounting dimension to a bevel gear which is not associated with the aforementioned drawbacks and limitations of the prior art proposals.

Another object of the present invention relates to a new and improved method of, and apparatus for, applying a mounting or installation dimension to a bevel gear in a simple and time saving manner.

The method aspects of the present invention are manifested by the features that there is automatically determined the addendum dimension of the bevel gear, that this addendum dimension is stored, that the stored addendum dimension and shoulder dimension are added together into a block dimension, and then the block dimension is applied to the bevel gear.

As already explained above the invention is not only converned with the aforementioned method aspects but also with a new and improved construction of apparatus for the performance thereof which is manifested by the features that there is provided a computer for the addition of both stored dimensions into a block dimension, this computer being operatively connected with the marking or inscription device for transmitting the block dimension from the computer to the marking device.

BREIF DESCRIPTION OF THE DRAWING

The invention will be better understood and objects other than those set forth above, will become apparent when consideration is given to the following detailed description thereof. Such description makes reference to the annexed drawing wherein the single FIGURE of the drawing schematically illustrates an exemplary embodiment of apparatus for the performance of the method of this development.

DETAILED DESCRIPTION OF THE PREFERRED EMBODIMENTS

Describing now the drawing, the exemplary embodiment of apparatus for the application of a mounting or installation dimension to a bevel gear as shown in the single FIGURE will be seen to incorporate a holder or support 10 at which there is located a pinion 11, the shoulder 12 of which bears against the holder 10. As schematically indicated by reference characters A and B the holder 10 is conveniently mounted so as to be displaceable in two directions which are essentially perpendicular to one another. The apparatus further embodies a marking or inscription device incorporating a printer mechanism 14 which is arranged opposite the front face or surface 13 of the pinion 11. By means of the printer mechanism 14 it is possible to engrave or otherwise apply to the front face 13 of the pinion 11 the shoulder dimension and addendum dimension. For each numerical value which is to be engraved at the pinion there is rotatably mounted at the printer mechanism 14 a number wheel 15 or equivalent structure. The printer mechanism 14 is operatively connected via a conductor or line 16 with a computer 17. This computer 17 is connected in turn through the agency of a conductor 18a with a first storage 19 and via a conductor 18b with a second storage 20. The first storage 19 serves to store the shoulder dimension and is operatively connected with a bevel gear testing or checking machine 21.

In the second storage 20 there is stored the addendum dimension as such term will be defined hereinafter. For this purpose the storage 20 is connected through the agency of a conductor or line 22 with a measurement value transmitter 23. This measurement value transmitter 23 possesses a feeler 24 which is capable of measuring the distance between the shoulder 12 and the front surface or face 13, and which distance constitutes the addendum dimension.

The mode of operation of the above-described components is as follows: The shafts of both bevel gears of a pair of gears are moved relative to one another at the bevel gear testing machine 21 for such length of time until there is obtained an optimum smooth or quiet running or the optimum bearing load. Thereafter in conventional manner there is measured the dimension from the theoretical mounting distance, i.e., the shoulder dimension and such is stored at the storage 19.

Thereafter, simultaneous with the imprinting of the pair number, there is determined by means of the feeler 24 the addendum dimension, i.e., the distance between the shoulder 12 and the front face 13 of the pinion 11 in that the holder 10 is displaced in the direction of the arrow A towards the printer mechanism or printer 14 until the front face 13 and the feeler 24 bear against the printer mechanism 14. In this position the feeler 24 measures the aforementioned spacing or distance and delivers the measurement result to the storage 20.

The shoulder dimension can be subsequently retrieved from the storage 19 and further transmitted to the computer 17, and likewise there can be retrieved from the storage 20 the addendum dimension and such transmitted to the computer 17. In the computer 17 both the shoulder dimension and the addendum dimension are added together to form the so-called block dimension and such is then transmitted via the conductor or line 16 to the printer mechanism 14. The resiliently mounted number wheel 15 of the printer mechanism 14 is electrically rotated in conventional manner for such length of time until the desired numbers of the block dimension are located opposite the front surface or face 13 of the pinion 11. Then the block dimension is engraved at the front surface 13 of such pinion.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for applying an installation dimension at a bevel gear having a shoulder and a front surface, comprising:
    a. a bevel gear testing machine for determining the shoulder dimension of the bevel gear;
    b. a storage for storing the determined shoulder dimension, said storage being operatively connected with the bevel gear testing machine;
    c. a measuring device for determining the distance between the shoulder and the front surface of the bevel gear and which distance constitutes the addendum dimension of the bevel gear;
    d. said measuring device incorporating a measurement value transmitter and a feeler for measuring said addendum dimension;
    e. a further storage for storing said addendum dimension of the bevel gear operatively connected with the measurement value transmitter of said measuring device;
    f. a marking device for applying data to the bevel gear, said marking device comprising a printer mechanism containing a rotatably mounted number wheel for each numerical value which is to be applied at the front surface of the bevel gear;
    g. said marking device further including a support at which there is located said bevel gear and said feeler of said measuring device;
    h. a computer for the addition of both the stored shoulder dimension and the addendum dimension into a block dimension;
    i. said computer being operatively connected with said two storage devices and with the marking device for transmitting the block dimension from the computer to the marking device.

2. A method of applying an installation dimension at a bevel gear having a shoulder and a front surface, comprising the steps of:
    a. measuring the shoulder dimension of the bevel gear;
    b. storing the thus measured shoulder dimension;
    c. applying other predetermined data to the front surface of the bevel gear;
    d. measuring the addendum dimension of the bevel gear constituted by the distance between the shoulder and the front surface of the bevel gear during the application of said other predetermined data to the front surface of the bevel gear;
    e. storing the thus measured addendum dimension;
    f. adding together the stored addendum dimension and shoulder dimension into a block dimension; and
    g. applying the block dimension to the bevel gear.

3. The method as defined in claim 2, including the step of applying said predetermined data in the form of a gear pair number to the front surface of the bevel gear.

* * * * *

UNITED STATES PATENT OFFICE
CERTIFICATE OF CORRECTION

PATENT NO. : 3,900,720
DATED : August 19, 1975
INVENTOR(S) : ERHARD KONERSMANN and RUDOLF GRUBER It is certified that error appears in the above-identified patent and that said Letters Patent are hereby corrected as shown below:

In the Heading, left-hand column after item [21] insert as a new line the following:
--[30] Foreign Application Priority Data
July 12, 1973   Switzerland ...... 10158/73--

Signed and Sealed this thirteenth Day of April 1976

[SEAL]

Attest:

RUTH C. MASON
Attesting Officer

C. MARSHALL DANN
Commissioner of Patents and Trademarks